Nov. 29, 1932.  J. B. MARIN  1,889,679
AUTOMOBILE BODY
Filed Oct. 6, 1930  6 Sheets-Sheet 3

J.B. Marin, INVENTOR
BY Victor J. Evans
ATTORNEY

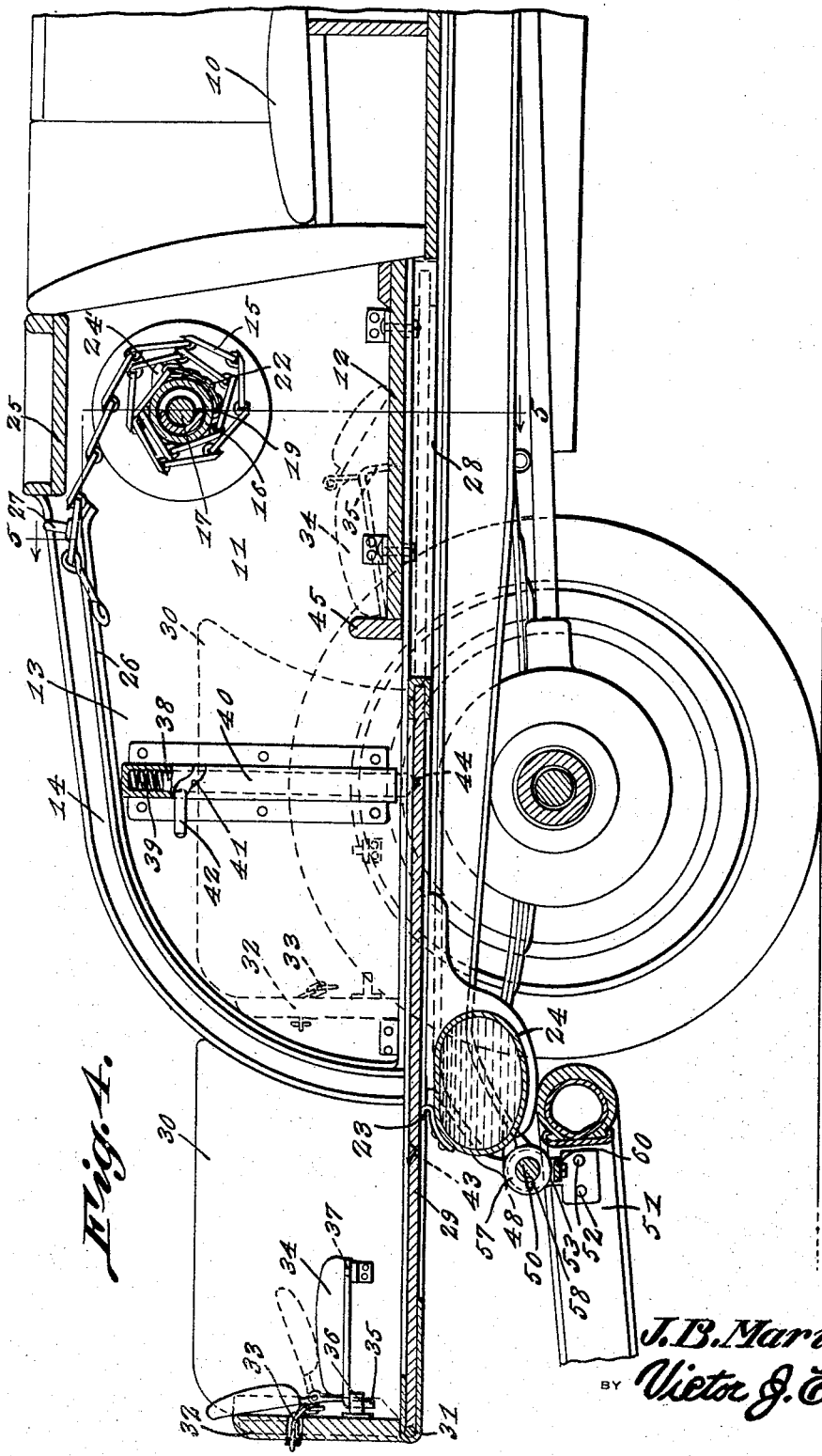

Nov. 29, 1932.  J. B. MARIN  1,889,679
AUTOMOBILE BODY
Filed Oct. 6, 1930  6 Sheets-Sheet 5
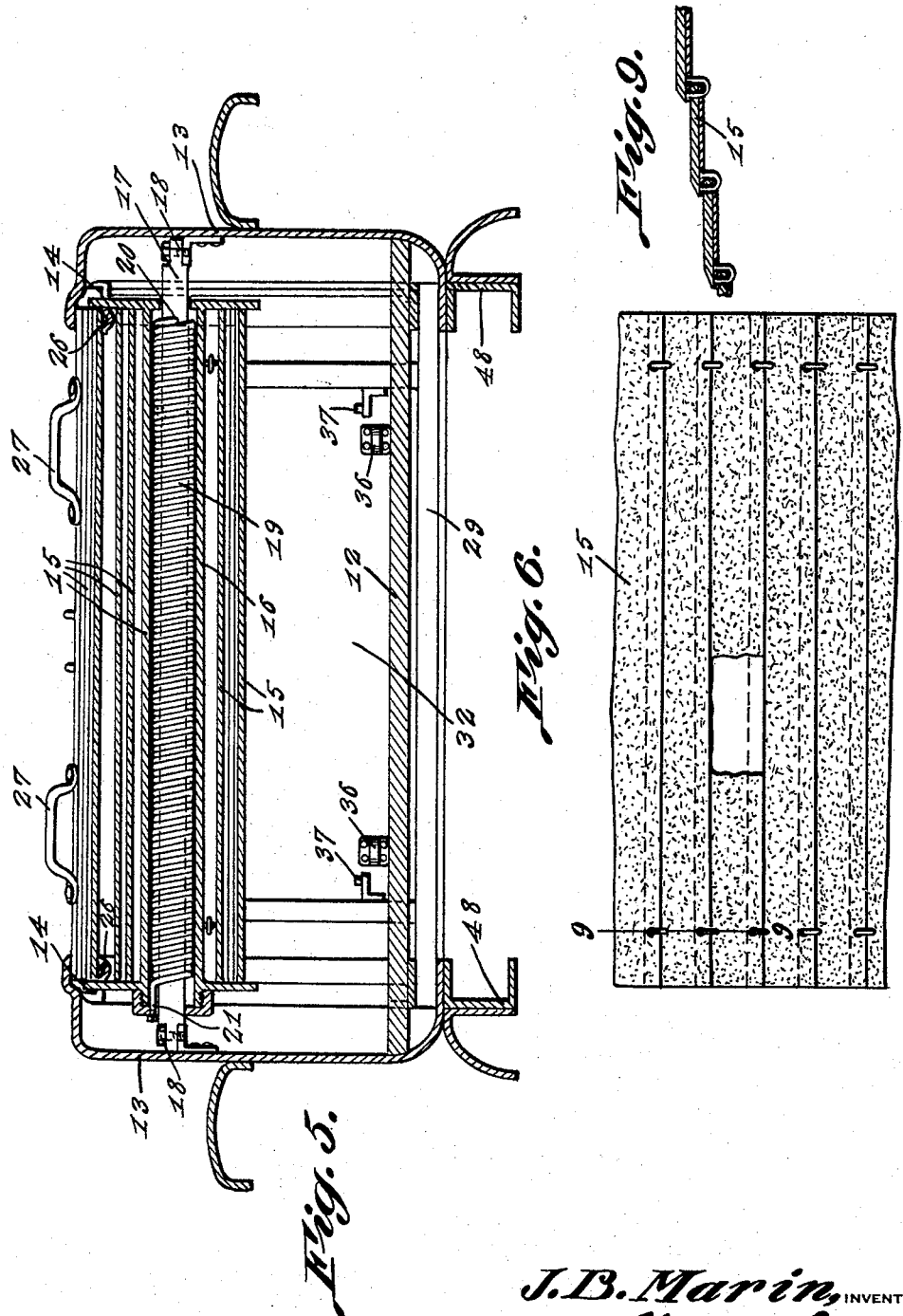
J. B. Marin, INVENTOR
BY Victor J. Evans
ATTORNEY Nov. 29, 1932.　　　J. B. MARIN　　　1,889,679
AUTOMOBILE BODY
Filed Oct. 6, 1930　　　6 Sheets-Sheet 6
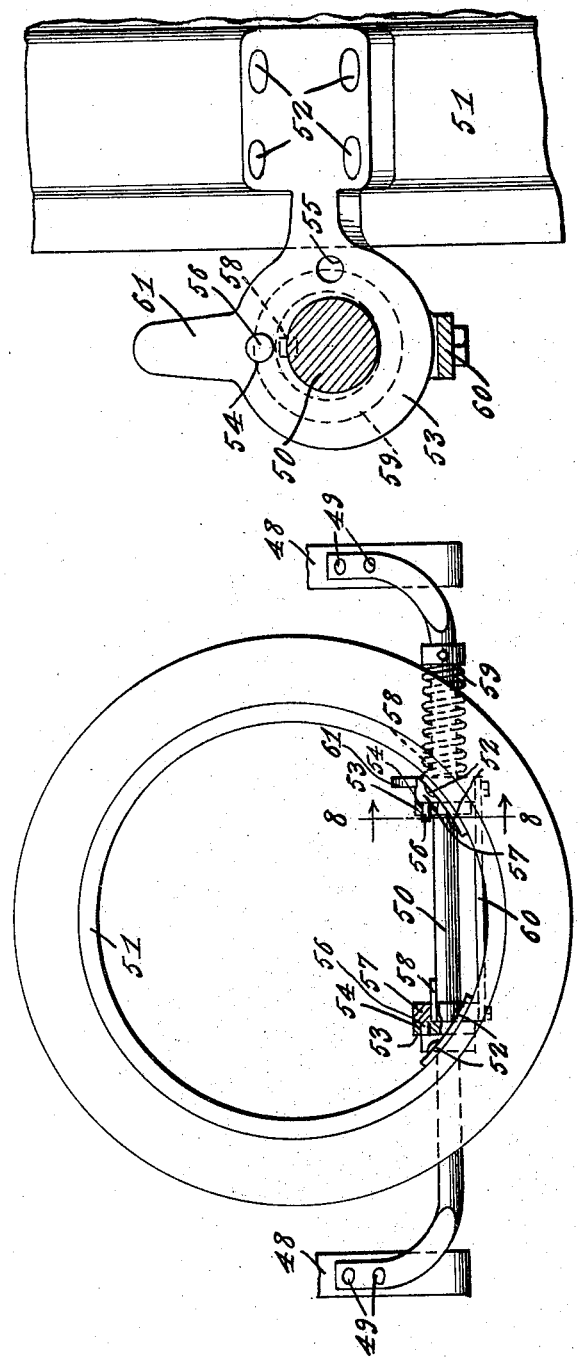
J. B. Marin, INVENTOR
BY Victor J. Evans
ATTORNEY Patented Nov. 29, 1932

1,889,679

UNITED STATES PATENT OFFICE

JOHN B. MARIN, OF DOUGLAS, ALASKA

AUTOMOBILE BODY

Application filed October 6, 1930. Serial No. 486,836.

This invention relates to improvements in vehicle body construction, and has for an object the provision of an automobile body which may be arranged to provide a closed compartment at the rear for carrying either passengers or merchandise, together with means for increasing the size of the compartment so as to carry either passengers or merchandise, or both.

Another object of the invention is the provision of a novel form and arrangement of cover for the compartment, which cover may be moved to an out of the way position when not in use.

Another object of the invention is the provision of means for mounting a spare tire carrier at the rear of the automobile body in such manner that the carrier (and tire carried thereby) may be moved to an out of the way position beneath the body when the size of the compartment is increased.

Another object of the invention is the provision of means of the above character which are simple in construction, efficient in use, and will permit of the ready arrangement of parts to suit different conditions.

With the above and other objects in view, the invention further includes the following novel features and details of construction, to be hereinafter more fully described, illustrated in the accompanying drawings and pointed out in the appended claims.

In the drawings:—

Figure 4 is an enlarged fragmentary sectional view taken substantially on the line 4—4 of Figure 2 but showing the top of the rear compartment open with the walls of the compartment extended.

Figure 5 is a section on the line 5—5 of Figure 4.

Figure 6 is a fragmentary plan view of a portion of the flexible cover for the compartment.

Figure 7 is a rear view with parts in section showing the manner of mounting the tire carrier.

Figure 8 is an enlarged fragmentary sectional view on the line 8—8 of Figure 7.

Figure 9 is a fragmentary sectional view taken substantially on the line 9—9 of Figure 6.

Figure 1:
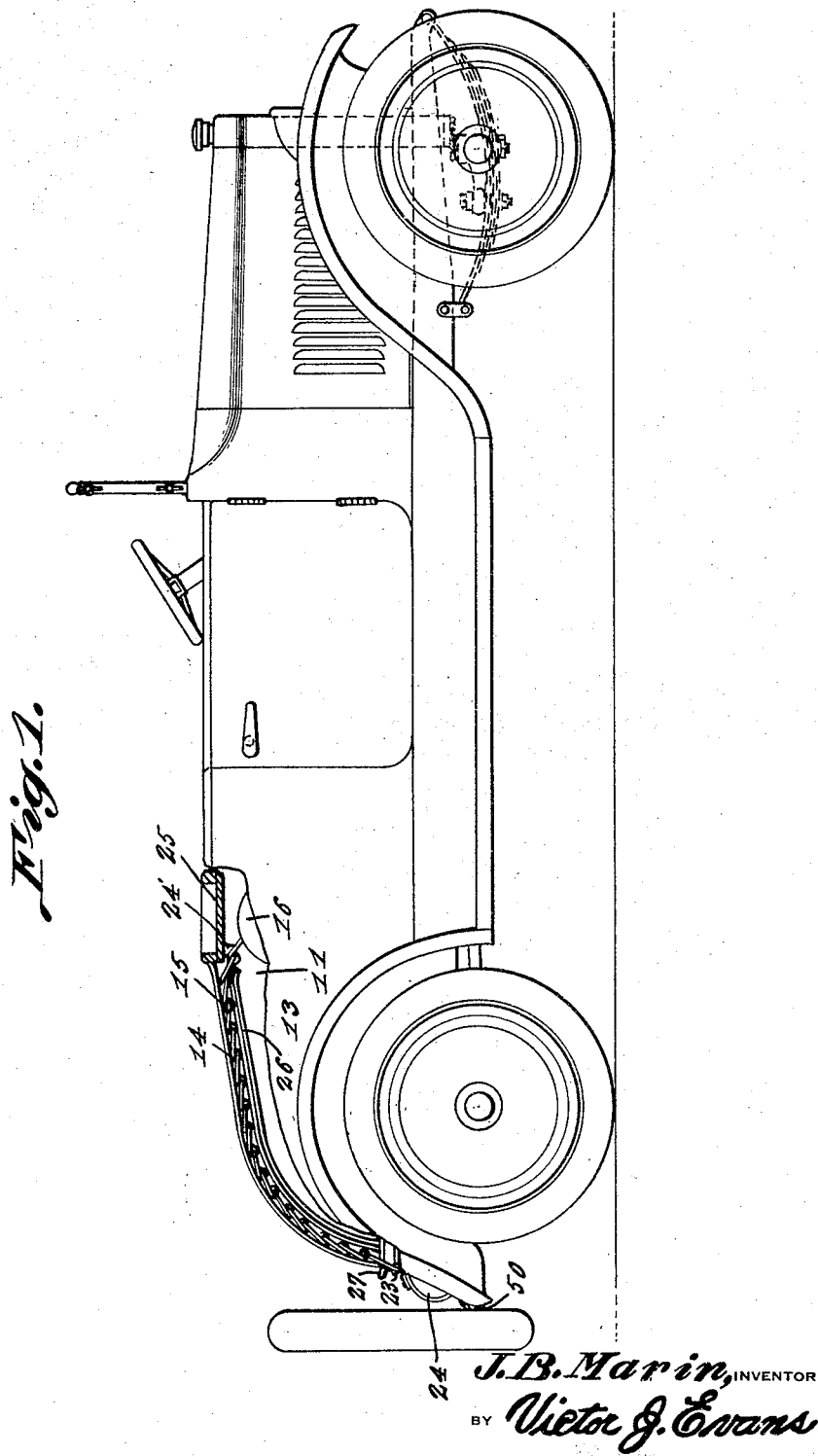
Figure 1 is a side elevation of an automobile having a body constructed in accordance with the invention, parts being broken away to more clearly illustrate the invention.
Figure 2:
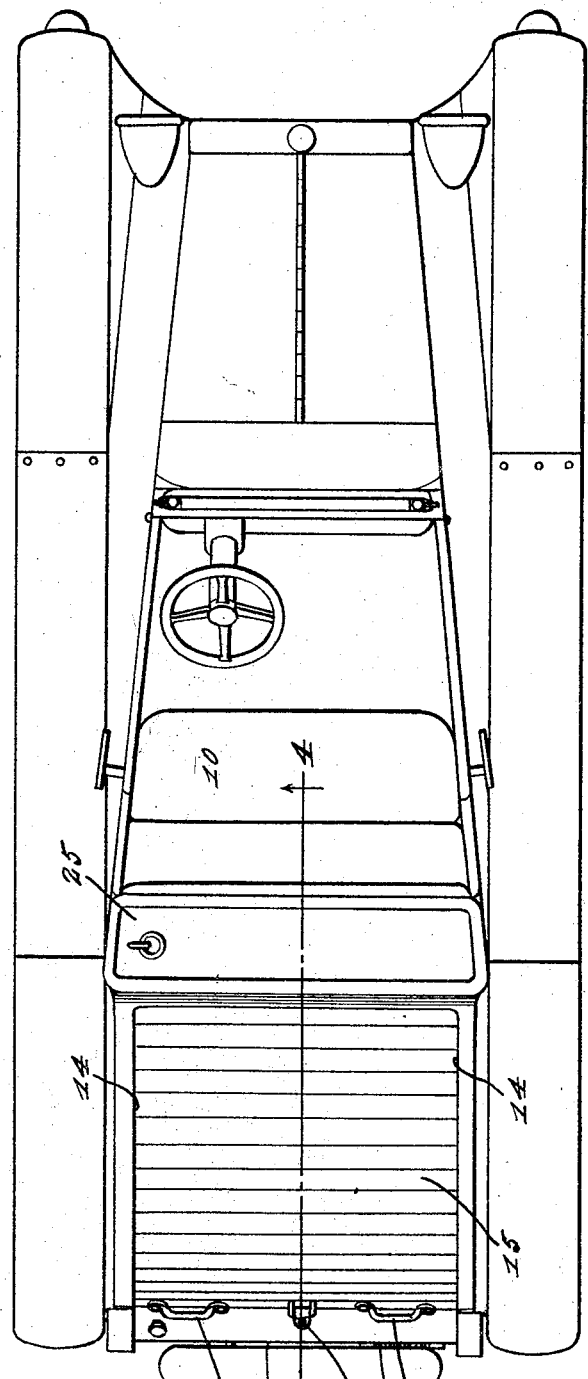
Figure 2 is a top plan view.
Figure 3:
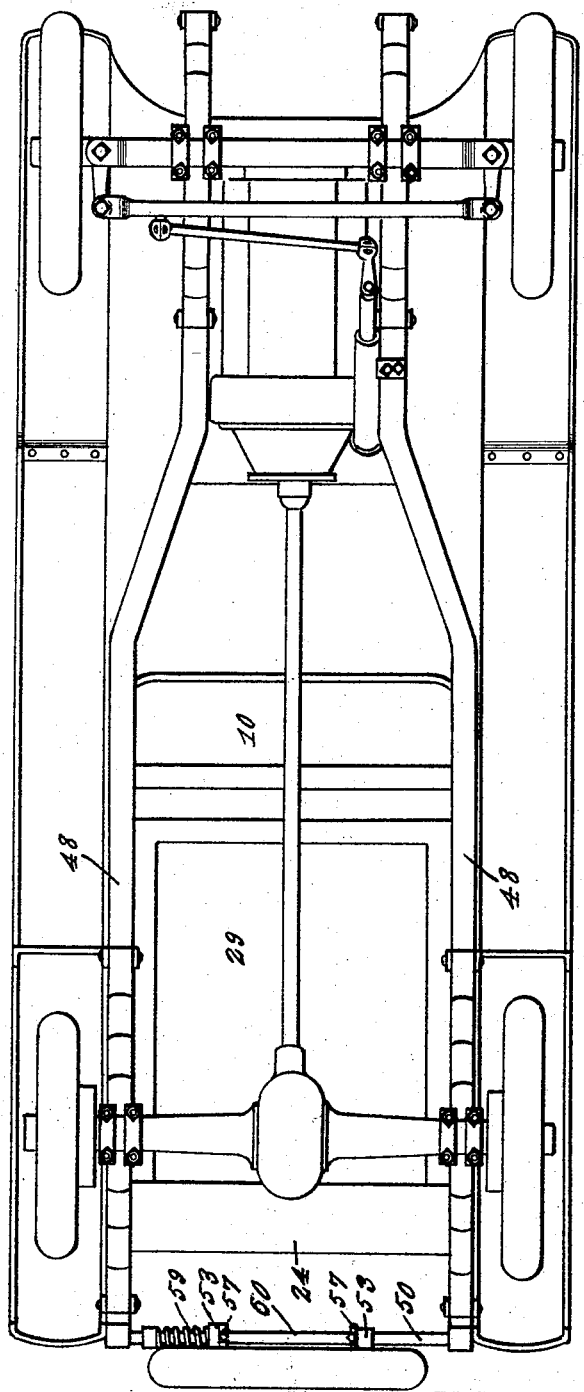
Figure 3 is a bottom view.

Referring to the drawings in detail wherein like characters of reference denote corresponding parts, the invention is shown in connection with an automobile body of the roadster type, wherein there is provided the usual seat 10 for the driver and a passenger.

In the present invention the body at the rear of the seat 10 is provided with a compartment 11. This compartment includes a stationary bottom section 12 and stationary side walls 13, the latter being provided along their upper edges with guide grooves 14 for a flexible cover 15. This cover provides a closure for the top and rear of the compartment 11 and is adapted to be wound upon a hollow shaft or drum 16 which is rotatable upon a shaft 17, the latter being stationary and removably mounted as at 18. This hollow shaft 16 is yieldingly held against rotation in one direction by means of a coiled spring 19, the latter having one end secured to the shaft 17 as shown at 20 and its opposite end secured to the end of the hollow shaft or drum 16 as shown at 21. When the shaft 16 is rotated in one direction this spring will be placed under tension with a tendency to rotate in an opposite direction due to the tension of this spring.

Secured to the shaft 16 through the medium of chains 22 is one edge of the flexible cover 15 and this cover is adapted to be guided in the grooves 14, and to be attached to a hook 23 which is carried by the fuel tank 24 at the rear of the body, or to any other convenient place. When so attached, the cover will form a complete closure for the compartment 11, and in order to exclude rain, dirt, etc., the inner edge of the cover is provided with a compressible water strip 24' which is adapted to engage under the edge of the forward portion of the compartment. This edge is formed by a removable panel 25 which is positioned over the hollow shaft or drum 16 and may be removed so as to obtain access to the drum. In addition, the side walls 13 of the rear compartment are provided adjacent the grooves 14 with transversely curved gutters or drains 26 whereby any moisture entering along the side edges of the cover will pass into these gutters or drains and be directed downward and rearward so as not to enter the compartment. The cover 15 is provided with spaced hand grips 27 for convenience in opening and closing the cover.

The lower edges of the side walls 13 of the compartment are provided with opposed guide grooves 28 and these grooves accommodate an extensible bottom section 29. This section 29 is so proportioned and arranged that it may be moved inward so that its outer edge will be within the compartment 11 and will permit the compartment to be closed with the section housed therein. Rising from opposite sides of this section 29 are side walls or pieces 30, while hingedly secured to the rear of the said section as shown at 31 is an end piece or gate 32. This gate when closed forms the rear wall of the compartment and may be held in closed position by means of a chain 33. When the parts are arranged as shown in the full lines in Figure 4 of the drawings, the compartment 11 will be engaged so as to accommodate both passengers, merchandise and luggage, so that the said compartment will materially increase the carrying capacity of the automobile.

A removable seat 34 is provided for the compartment and this seat, when not in use, may be stored within the compartment as indicated by the dotted lines, so that the compartment may be used exclusively for carrying luggage or merchandise. The seat 34 is removably mounted within the compartment and for this purpose, its rear edge is provided with lugs 35 which are removably received within apertured ears 36 forming hangers carried by the end gate 32, while lugs 37 forming hangers carried by the side walls 30 are removably received within sockets provided along the side edges of the seat. The seat is thus removably positioned within the compartment and when arranged in position for use, will provide reinforcing means for the side and end walls of the compartment. When the section 20 is not extended it may occupy the position shown by the dotted lines shown in Figure 4.

When the section 29 is housed within the compartment 11, it is held against movement by means of a locking bolt 38 which is yieldingly forced downward by means of a spring 39 arranged within the bolt housing 40. This housing is provided with an inclined slot 41 for the passage of a pin 42 which is carried by the bolt and when this pin is in the lower portion of the slot 41, the lower end of the bolt will enter a socket 43 provided in the bottom extension 29. When the extension is extended, this pin will enter a socket 44 provided in said bottom extension.

The rigid section 12 of the bottom of the compartment 11 is provided with a foot rail 45 for the convenience of the occupants, and this rail also forms a wall for a storage space within the compartment where the seat 34 may be stored when not in use.

Secured to the side bars 48 of the frame of the vehicle as shown at 49, are the opposite ends of a bar 50 so that this bar extends transversely at the rear of the vehicle adjacent the fuel tank 24. The bar 50 is designed to support a spare tire carrier 51 and for this purpose the carrier has secured thereto as shown at 52, ears 53, the latter being provided with openings for the passage of the bar 50, so that the carrier 51 will be rotatable upon the bar. The ears 53 are provided with openings 54 and 55 which are adapted to removably receive pins 56 which extend from collars 57. These collars are keyed to the bar 50 as shown at 58 so that they may move longitudinally of the bar, but will be held against rotary movement, a spring 59 mounted upon the bar serving to force the collar carried pins 56 into either the openings 54 or 55. When the pins 56 engage within the openings 55, the tire carrier will be in an upright position, but by moving the collars longitudinally of the bar 50 the pins will be disengaged from the ears 53 so that the tire carrier may swing downward to the position shown in Figure 4. In this position, the pins 56 will engage within the openings 54 to hold the carrier in place. The collars 57 are connected by means of a bar 60 and one of these collars has a finger piece 61 extending therefrom. Thus, the collars may be conveniently and simultaneously moved upon the rod 50.

The invention is susceptible of various changes in its form, proportions and minor details of construction and the right is herein reserved to make such changes as properly fall within the scope of the appended claim.

Having described the invention what is claimed is:—

In combination with the tonneau end of an automobile body forming an open compartment, of a slidable floor section movable within and without the compartment, side pieces on the slidable floor, an end piece hinged to the outer end edge of said slidable floor, hangers on the side and end pieces, a seat removably supported by said hangers, a hinged back on the seat and a chain loosely anchored in the end piece and connecting the seat therewith for effecting the release of the latter when the seat is removed from the hangers and brought to rest upon the slidable floor within the compartment.

In testimony whereof I affix my signature.

JOHN B. MARIN.